United States Patent
DeLancey et al.

(10) Patent No.: US 8,727,706 B2
(45) Date of Patent: May 20, 2014

(54) SYSTEM FOR PROVIDING COOLING AND PURGING AIR FLOW TO A ROTARY MACHINE ONLINE MONITORING SYSTEM

(75) Inventors: James Peter DeLancey, Corinth, NY (US); Jeremy Clyde Bailey, Middle Grove, NY (US); Nirm Velumylum Nirmalan, Niskayuna, NY (US); Guanghua Wang, Clifton Park, NY (US); Jason Randolph Allen, Niskayuna, NY (US); Lucy Joelle Summerville, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 807 days.

(21) Appl. No.: 12/984,453

(22) Filed: Jan. 4, 2011

(65) Prior Publication Data

US 2012/0171015 A1    Jul. 5, 2012

(51) Int. Cl.
*F04D 29/00*    (2006.01)

(52) U.S. Cl.
USPC .......................................... 415/118; 415/201

(58) Field of Classification Search
USPC .................. 415/118, 201; 416/61; 73/112.01, 73/112.03, 112.05
See application file for complete search history.

(56) References Cited

U.S. PATENT DOCUMENTS

| | | | |
|---|---|---|---|
| 4,240,691 A | 12/1980 | Holmqvist et al. |
| 4,306,835 A | 12/1981 | Hurley |
| 4,657,386 A | 4/1987 | Suarez-Gonzalez et al. |
| 4,738,528 A | 4/1988 | Craft |
| 4,784,491 A | 11/1988 | Penney et al. |
| 4,786,188 A | 11/1988 | Myhre et al. |
| 4,836,689 A | 6/1989 | O'Brien et al. |
| 4,934,137 A | 6/1990 | MacKay |
| 5,146,244 A | 9/1992 | Myhre et al. |
| 5,421,652 A | 6/1995 | Kast et al. |
| 5,467,815 A | 11/1995 | Haumann et al. |
| 5,599,105 A | 2/1997 | Ridley et al. |
| 5,626,462 A | 5/1997 | Jackson et al. |
| 5,640,767 A | 6/1997 | Jackson et al. |
| 5,724,816 A | 3/1998 | Ritter et al. |
| 5,813,836 A | 9/1998 | Starkweather |
| 5,820,337 A | 10/1998 | Jackson et al. |
| 5,822,853 A | 10/1998 | Ritter et al. |

(Continued)

OTHER PUBLICATIONS

Hayden et al., "Evaluating Lens Purge Systems for Optical Sensors on Turbine Engines," AIAA/ASME/SAE/ASEE 24th Joint Propulsion Conference, Jul. 11-13, 1998, No. AIAA-1988-3037, Boston, MA.

(Continued)

*Primary Examiner* — Edward Look
*Assistant Examiner* — Maxime Adjagbe
(74) *Attorney, Agent, or Firm* — Ann M. Agosti

(57) ABSTRACT

In one embodiment, a system includes a sight tube configured to optically communicate with an interior of a rotary machine via insertion within an inspection port. The sight tube includes a window and multiple openings configured to direct purge air across the window. The system also includes a curtain tube disposed about the sight tube and configured to direct purge air from a first air source to the openings via a first passage formed between an inner surface of the curtain tube and an outer surface of the sight tube. The curtain tube includes multiple outlets configured to direct curtain air around the window, and the curtain tube is configured to direct the curtain air from a second air source to the outlets via a second passage formed between an outer surface of the curtain tube and an inner surface of the inspection port.

20 Claims, 5 Drawing Sheets

(56) References Cited

U.S. PATENT DOCUMENTS

| | | |
|---|---|---|
| 6,000,908 A | 12/1999 | Bunker |
| 6,761,031 B2 | 7/2004 | Bunker |
| 7,091,470 B2 | 8/2006 | Horikawa et al. |
| 7,231,817 B2 | 6/2007 | Smed et al. |

OTHER PUBLICATIONS

Lucia et al., "An Infrared Pyrometry System for Monitoring Gas Turbine Blades: Development of a Computer Model and Experimental Results," J. Eng. Gas Turb. Power, 1994, pp. 172-177, vol. 116.

Kerr et al., "A Review of Purge Air Designs for Aeroengine-Based Optical Pyrometers," J. Turbomach, 2002, pp. 227-234, vol. 124, No. 2.

Kerr et al., "Particle Deposition on Optical Pyrometer Lenses: An Illustrative Case Study," J. Aerosol Sci., 2002, pp. 1577-1588, vol. 33, No. 11.

Kerr et al., "Computational Comparison of the RB199 and GE90 Pyrometer Purging Systems," International Gas Turbine Institute, 2002, pp. 261-269, vol. 2A.

Kerr et al., "Optical Fouling of the RB199 Pyrometer," J. Propul. Power, 2003, pp. 66-72, vol. 19, No. 1.

Kerr et al., "An Evaluation of Air-Purging Configurations for Optical Pyrometers in Gas Turbines," Aerosol Sci. Tech., 2004, pp. 91-99, vol. 38, No. 2.

Kerr et al., "Exploratory Design Modifications for Enhancing Pyrometer Purge Air System Performance," Int. J. Turbo Jet Eng., 2004, pp. 203-210, vol. 21, No. 3.

Kerr et al., "Particle Deposition in the GE90 Pyrometer Purge Air System," Particul. Sci. Technol., 2004, pp. 51-64, vol. 22, No. 1.

SYSTEM FOR PROVIDING COOLING AND PURGING AIR FLOW TO A ROTARY MACHINE ONLINE MONITORING SYSTEM

BACKGROUND OF THE INVENTION

The subject matter disclosed herein relates to a system for providing cooling and purging air flow to a rotary machine online monitoring system.

Certain gas turbine engines include a turbine having inspection ports configured to facilitate monitoring of various components within the turbine. For example, a pyrometry system may be in optical communication with an interior of the turbine via the inspection ports and configured to measure the temperature of certain components within a hot gas path of the turbine. Typical pyrometry systems include a sight tube inserted within the inspection port and configured to covey emitted and/or reflected radiation from turbine components to a detector. Such pyrometry systems utilize a transparent window positioned at the tip of the sight tube to protect the sensitive optical component of the sight tube from the hot gas stream flowing through the turbine. Unfortunately, during operation of the turbine, the window may become obscured due to buildup of contaminants (e.g., unburned hydrocarbons in combustion products and/or particles from an air flow) on the surface of the window. In addition, molten metal particles may become imbedded within the window upon impact. As the window becomes obscured, the accuracy of the pyrometry system may be reduced.

BRIEF DESCRIPTION OF THE INVENTION

In one embodiment, a system includes a sight tube configured to optically communicate with an interior of a rotary machine via insertion within an inspection port. The system also includes a first interchangeable nozzle tip removably secured to the sight tube. The first interchangeable nozzle tip includes a window and multiple openings configured to direct purge air across the window. The system further includes a curtain tube disposed about the sight tube and configured to direct the purge air from a first air source to the openings via a first passage formed between an inner surface of the curtain tube and an outer surface of the sight tube. In addition, the system includes a second interchangeable nozzle tip removably secured to the curtain tube. The second interchangeable nozzle tip includes multiple outlets configured to direct curtain air around the window. The curtain tube is configured to direct the curtain air from a second air source to the outlets via a second passage formed between an outer surface of the curtain tube and an inner surface of the inspection port.

In another embodiment, a system includes a sight tube configured to optically communicate with an interior of a rotary machine via insertion within an inspection port. The sight tube includes a window and multiple openings configured to direct purge air across the window. The system also includes a curtain tube disposed about the sight tube and configured to direct purge air from a first air source to the openings via a first passage formed between an inner surface of the curtain tube and an outer surface of the sight tube. The curtain tube includes multiple outlets configured to direct curtain air around the window, and the curtain tube is configured to direct the curtain air from a second air source to the outlets via a second passage formed between an outer surface of the curtain tube and an inner surface of the inspection port.

In a further embodiment, a system includes a sight tube configured to optically communicate with an interior of a rotary machine via insertion within an inspection port. The system also includes an interchangeable nozzle tip removably secured to the sight tube. The interchangeable nozzle tip includes a window and multiple openings configured to direct purge air across the window.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
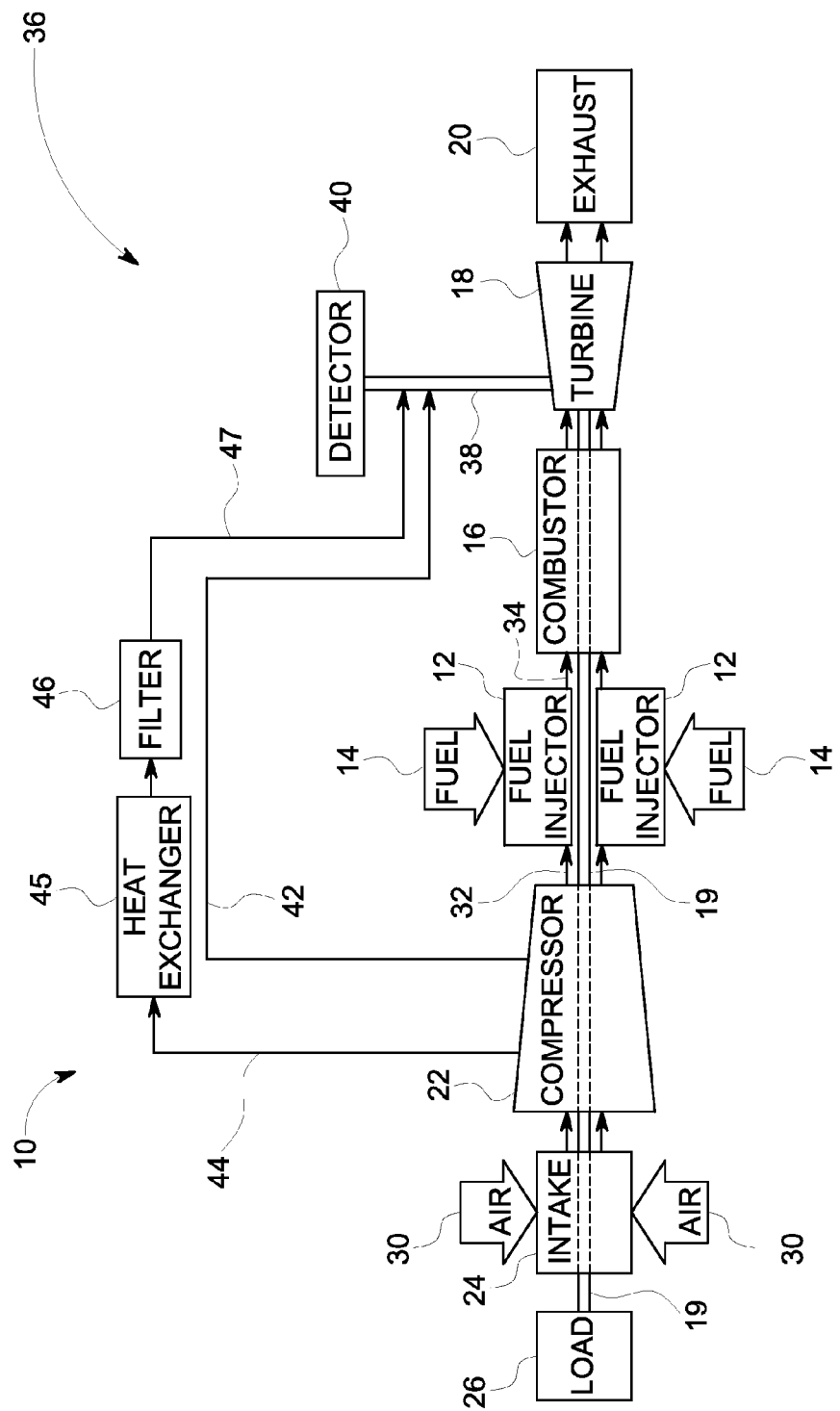
FIG. 1 is a block diagram of an embodiment of a turbine system including an optical monitoring system configured to direct an air flow across a sight tube window to reduce buildup of contaminants on the window.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may provide an air flow adjacent to a window of an optical probe assembly to protect the window from a hot gas stream within a turbine. In certain embodiments, the optical probe assembly is configured to optically communicate with an interior of a turbine via insertion within an inspection port. The optical probe assembly includes a sight tube and a sight tube nozzle tip removably secured to the sight tube. The sight tube nozzle tip includes a window and multiple openings configured to direct purge air across the window. A curtain tube disposed about the sight tube is configured to direct the purge air from a first air source to the openings via a first passage formed between an inner surface of the curtain tube and an outer surface of the sight tube. In addition, the optical probe assembly includes a curtain nozzle tip removably secured to the curtain tube. The curtain nozzle tip includes multiple outlets configured to direct curtain air around the window. The curtain tube is configured to direct the curtain air from a second air source to the outlets via a second passage formed between an outer surface of the curtain tube and an inner surface of the inspection port. The combination of the curtain air and the purge air may serve to maintain the window within a desired operating temperature range, and to substantially reduce accumulation of contaminants on the surface of the window. Because the purge air and the curtain air are provided by different air sources, the window may be protected even if one air source fails to operate effectively. Furthermore, because the nozzle tips are interchangeable, particular nozzle tips having a desired arrangement of openings and/or outlets may be selected for a particular turbine configuration, thereby providing the window with effective thermal and contaminant protection.

Turning now to the drawings, FIG. 1 is a block diagram of an embodiment of a turbine system including an optical monitoring system configured to direct an air flow across a sight tube window to reduce buildup of contaminants on the window. While a turbine system is described below, it should be appreciated that the optical monitoring system may be utilized to monitor components within other rotary machines or turbo machines, such as a compressor, a jet engine, a pump, or a steam turbine, for example. The illustrated turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized gas into a turbine 18. As will be appreciated, the turbine 18 includes one or more stators having fixed vanes or blades, and one or more rotors having blades which rotate relative to the stators. The hot gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the gas may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes an optical monitoring system 36 optically coupled to the turbine 18. In the illustrated embodiment, the optical monitoring system 36 includes an optical probe assembly 38 configured to be inserted within an inspection port. The optical probe assembly 38 is configured to convey emitted and/or reflected radiation from turbine components to a detector 40. As discussed in detail below, the optical probe assembly 38 includes a sight tube having a window and multiple openings configured to direct purge air across the window. The optical probe assembly also includes a curtain tube disposed about the sight tube and configured to direct purge air from a first air source to the openings via a first passage formed between an inner surface of the curtain tube and an outer surface of the sight tube. Furthermore, the curtain tube includes multiple outlets configured to direct curtain air around the window. The curtain tube is also configured to direct the curtain air from a second air source to the outlets via a second passage formed between an outer surface of the curtain tube and an inner surface of the inspection port. In such a configuration, the purge air flowing across the window may serve to provide a barrier between the hot gas flowing through the turbine 18 and the window, thereby protecting the window from contaminants that may otherwise accumulate on the surface of the window. The purge air may also provide cooling to ensure that the temperature of the window remains within a desired range. In addition, the curtain air flowing around the window may divert contaminants (e.g., unburned hydrocarbons, dirt, molten metal particles, etc.) flowing through the hot gas, thereby further reducing accumulation of contaminants on the surface of the window.

In the illustrated embodiment, the compressor 22 provides both the first and second air sources for the optical probe assembly 38. Specifically, the second air source includes a discharge air flow 42 from the compressor 22. While the illustrated embodiment employs discharge air 42 from a later stage of the compressor 22, it should be appreciated that alternative embodiments may utilize discharge air from other compressor stages. However, in the illustrated embodiment, the pressure of the discharge air 42 provided to the optical probe assembly 38 is higher than the pressure of the hot gas within the turbine at the location of the optical probe assembly 38. Consequently, the flow of curtain air from the second air source will divert the hot gas away from the window of the optical probe assembly 38, thereby substantially reducing accumulation of contaminants on the surface of the window.

In addition, the first air source also includes a discharge air flow 44 from the compressor 22. While the illustrated embodiment employs discharge air 44 from an intermediate stage of the compressor, it should be appreciated that alternative embodiments may utilize discharge air from other compressor stages. However, in the illustrated embodiment, the pressure of the discharge air 44 provided to the optical probe assembly 38 is higher than the pressure of the hot gas within the turbine at the location of the optical probe assembly 38. As illustrated, the discharge air 44 flows into a heat exchanger 45 configured to decrease the temperature of the discharge air 44. As will be appreciated, the temperature of the discharge air 44 may be between about 800 to 900 degrees Fahrenheit (427 to 482 degrees Celsius) for certain compressor configurations. In certain embodiments, the heat exchanger 45 may be configured to decrease the temperature of the discharge air 44 to between about 300 to 400 degrees Fahrenheit (149 to 204 degrees Celsius), thereby providing the optical probe window with enhanced cooling. After the discharge air 44 has been cooled, the air flows into a filter 46 configured to screen particulates and liquids from the air flow. For example, the discharge air 44 may include oils configured to lubricate the compressor 22, metal particles from the compressor 22 and/or contaminants drawn into the compressor 22 from the ambient air. By filtering such material from the discharge air 44, the filter 46 may provide a substantially clean air flow 47 to the optical probe assembly 38, thereby substantially reducing accumulation of contaminants on the surface of the window. While the first air source 47 is provided by the compressor 22 in the illustrated embodiment, it should be appreciated that alternative embodiments may utilize an auxiliary compressor to provide the desired air flow to the optical probe assembly 38.

Figure 2:
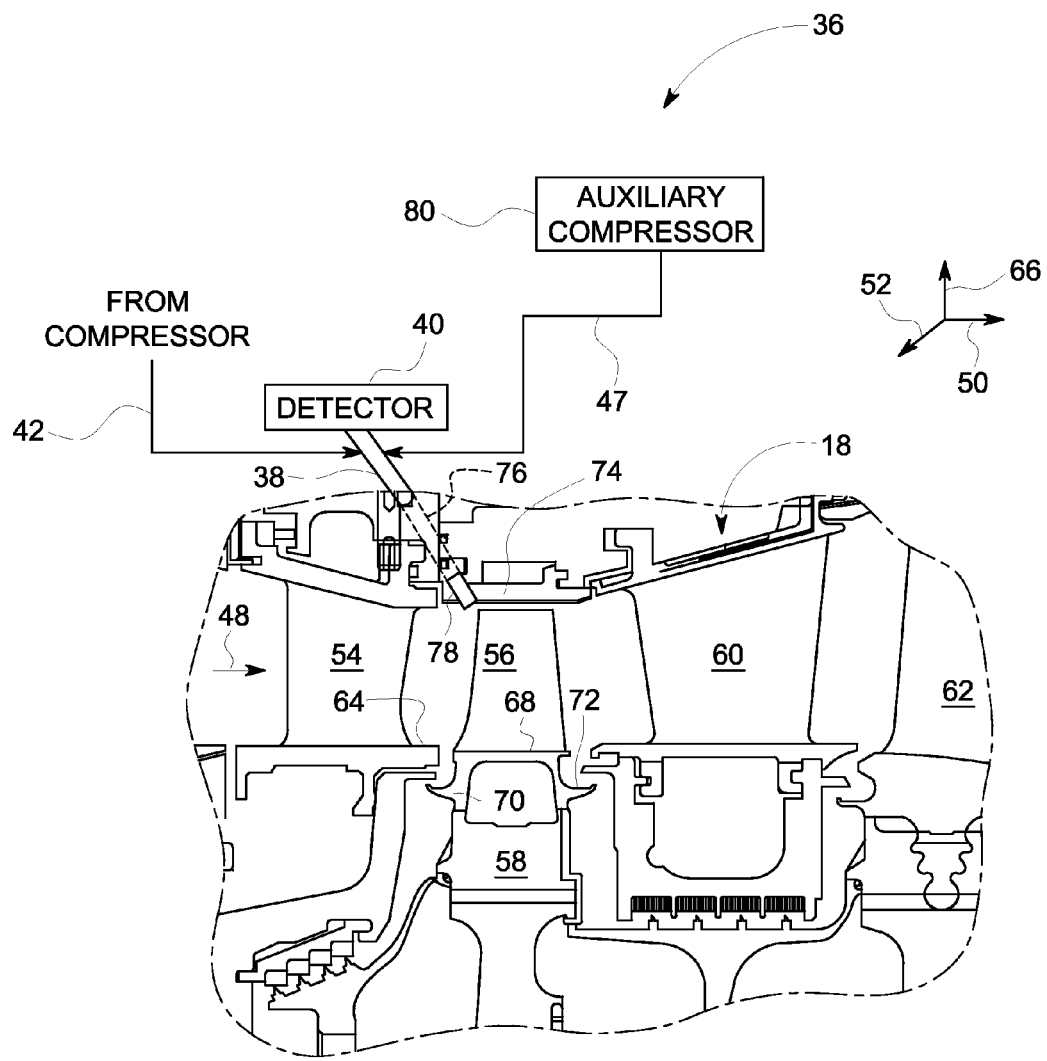
FIG. 2 is a cross-sectional view of an exemplary turbine section, illustrating various turbine components that may be monitored by an embodiment of the optical monitoring system.

FIG. 2 is a cross-sectional view of an exemplary turbine section, illustrating various turbine components that may be monitored by an embodiment of the optical monitoring system 36. As illustrated, hot pressurized gas 48 from the combustor 16 flows into the turbine 18 in an axial direction 50 and/or a circumferential direction 52. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 54 and blades 56 substantially equally spaced in the circumferential direction 52 about the turbine 18. The first stage vanes 54 are rigidly mounted to the turbine 18 and configured to direct combustion gases toward the blades 56. The first stage blades 56 are mounted to a rotor 58 that is driven to rotate by the hot gas 48 flowing through the blades 56. The rotor 58, in turn, is coupled to the shaft 19, which drives the compressor 22 and the load 26. The hot gas 48 then flows through second stage vanes 60 and second stage blades 62. The second stage blades 62 are also coupled to the rotor 58. As the hot gas 48 flows through each stage, energy from the gas is converted into rotational energy of the rotor 58. After passing through each turbine stage, the hot gas 48 exits the turbine 18 in the axial direction 50.

In the illustrated embodiment, each first stage vane 54 extends outward from an endwall 64 in a radial direction 66. The endwall 64 is configured to block hot gas 48 from entering the rotor 58. A similar endwall may be present adjacent to the second stage vanes 60, and subsequent downstream vanes, if present. Similarly, each first stage blade 56 extends outward from a platform 68 in the radial direction 66. As will be appreciated, the platform 68 is part of a shank 70 which couples the blade 56 to the rotor 58. The shank 70 also includes a seal, or angel wing, 72 configured to block hot gas 48 from entering the rotor 58. Similar platforms and angel wings may be present adjacent to the second stage blades 62, and subsequent downstream blades, if present. Furthermore, a shroud 74 is positioned radially outward from the first stage blades 56. The shroud 74 is configured to minimize the quantity of hot combustion gas 48 that bypasses the blades 56. Gas bypass is undesirable because energy from the bypassing gas is not captured by the blades 56 and translated into rotational energy. While embodiments of the optical monitoring system 36 are described below with reference to monitoring components within the turbine 18 of a gas turbine engine 10, it should be appreciated that the optical monitoring system 36 may be employed to monitor components within other rotary machines, such as a jet engine, a steam turbine or a compressor, for example.

As illustrated, the optical probe assembly 38 extends into an interior of the turbine 18 through an inspection port 76. As will be appreciated, inspection ports may be positioned at various locations along the turbine casing to facilitate inspection of turbine components. In the illustrated embodiment, the optical monitoring system 36 is configured to monitor turbine components during operation of the turbine 18 to enable an operator or automated system to detect elevated turbine component temperatures. While the illustrated embodiment includes a single optical probe assembly 38 directed toward the first stage blades 56, it should be appreciated that alternative embodiments may include more optical probe assemblies 38. For example, certain embodiments may employ 1, 2, 3, 4, 5, 6, 7, 8, or more optical probe assemblies 38 to convey emitted and/or reflected radiation from each blade 56 to the detector 40. As will be appreciated, if more optical probe assemblies 38 are employed to monitor the first stage blades 56, more regions of each blade 56 may be monitored.

While the optical probe assembly 38 is directed toward the first stage blades 56 in the illustrated embodiment, it should be appreciated that the optical probe assembly 38 may be directed toward other turbine components in alternative embodiments. For example, one or more optical probe assemblies 38 may be directed toward the first stage vanes 54, the second stage vanes 60, the second stage blades 62, the endwalls 64, the platforms 68, the angel wings 72, the shrouds 74, or other components within the turbine 18. Further embodiments may include optical probe assemblies 38 directed toward multiple components within the turbine 18. Similar to the first stage blades 56, the optical monitoring system 36 may monitor the temperature of each component to facilitate detection of elevated turbine component temperatures.

As previously discussed, the optical probe assembly 38 is configured to convey emitted and/or reflected radiation from turbine components to the detector 40. The detector 40 may be configured to capture multiple images of the turbine components over a period of time. As will be appreciated, certain turbine components, such as the first stage blades 56 described above, may rotate at high speed along the circumferential direction 52 of the turbine 18. Consequently, to capture an image of such components, the detector 40 may be configured to operate at an integration time sufficient to capture a substantially still image of each component. For example, in certain embodiments, the detector 40 may be configured to capture the image of the turbine component with an integration time shorter than about 10, 5, 3, 2, 1, or 0.5 microseconds, or less.

In the illustrated embodiment, the optical monitoring system 36 is configured to determine a temperature of the turbine component based on an intensity of radiation emitted by the component. For example, the blade 56 will emit radiation over a wide range of wavelengths as the temperature of the blade increases. In addition, certain combustion products species, such as water vapor and carbon dioxide, absorb and emit radiation over a wide range of wavelengths in response to increased temperature, pressure and/or species concentrations. As a result, during operation of the gas turbine engine 10, only a fraction of wavelengths emitted by the blade 56 reach the optical monitoring system 36 with sufficient intensity and negligible interference for accurate intensity measurement. Consequently, the optical monitoring system 36 may be configured to measure the intensity of certain wavelengths which are more likely to pass through the hot combustion gas 48 without significant absorption or interference to determine the temperature of the blade 56. For example, wavelengths within the red portion of the visible spectrum and/or within the near infrared spectrum may pass through the hot gas 48 with less absorption than other frequency ranges. Therefore, certain embodiments may utilize such frequency ranges for determining the temperature of the blade 56. For example, certain optical monitoring systems 36 may be configured to measure the intensity of wavelengths within a range of approximately 0.5 to 1.4 microns, 1.5 to 1.7 microns, and/or 2.1 to 2.4 microns to determine blade temperature. However, it should be appreciated that alternative embodiments may measure an intensity of electromagnetic radiation within other portions of the visible, infrared and/or ultraviolet spectra. Furthermore, certain embodiments may utilize a two-dimensional detector array to capture two-dimensional images and/or emissions indicative of two-dimensional temperature profiles of the turbine components.

As previously discussed, the optical probe assembly 38 includes a sight tube having a window and multiple openings configured to direct purge air across the window. The optical probe assembly also includes a curtain tube disposed about the sight tube and configured to direct purge air from a first air source to the openings via a first passage formed between an inner surface of the curtain tube and an outer surface of the sight tube. Furthermore, the curtain tube includes multiple outlets configured to direct curtain air around the window. The curtain tube is also configured to direct the curtain air from a second air source to the outlets via a second passage formed between an outer surface of the curtain tube and an inner surface of the inspection port. In the illustrated embodiment, a tip assembly 78 is coupled to an end of the optical probe assembly 38, opposite from the detector 40. As discussed in detail below, the tip assembly 78 is configured to be removable, thereby enabling an operator to readily change tip assemblies 78 based on desired operating conditions. For example, in the illustrated embodiment, the tip assembly 78 includes a first interchangeable nozzle tip (e.g., sight tube nozzle tip) removably secured to the sight tube, and a second interchangeable nozzle tip (e.g., curtain nozzle tip) removably secured to the curtain tube. In such a configuration, the first interchangeable nozzle tip includes the window and the openings, and the second interchangeable nozzle tip includes the outlets. Consequently, a flow pattern across the window may be adjusted by exchanging the first interchangeable nozzle tip with another tip having a different opening configuration (e.g., variations in hole size, number of holes, orientation of the holes, etc.). Similarly, a flow pattern of curtain air around the window may be varied by exchanging the second interchangeable nozzle tip with another tip having a different outlet configuration (e.g., variations in outlet geometry, number of outlets, orientation of the outlets, etc.). As a result, the tip assembly 78 may be particularly configured for a desired turbine configuration, thereby enabling a standardized sight tube design to be employed within a variety of turbine configurations.

In addition, because the window is attached to the first interchangeable nozzle tip, the window may be replaced without having to recalibrate the optical probe assembly 38. For example, if the window is fixed to the optical probe assembly and the window becomes obscured due to accumulation of contaminants on the surface of the window, the optical probe assembly may be removed from the inspection port and replaced with a new assembly. Unfortunately, due to variations in optics within the sight tube of each optical probe assembly, the assembly is generally recalibrated after installation. As will be appreciated, the recalibration procedure may be time consuming, thereby reducing the availability of the turbine system 10. In contrast, to replace a window in the illustrated configuration, the optical probe assembly 38 is removed from the inspection port 76, and the first interchangeable nozzle tip is replaced with a new nozzle tip. Because the original sight tube is utilized, the process of recalibrating the optics may be obviated. As a result, the time associated with window replacement may be significantly reduced, thereby increasing turbine system availability.

In the illustrated embodiment, the first air source 47 is provided by an auxiliary compressor 80. The auxiliary compressor 80 is configured to provide a pressure greater than the pressure of the hot gas stream 48 at the location of the optical probe assembly 30, thereby facilitating flow of purge air across the window. In the illustrated embodiment, the auxiliary compressor 80 is powered independently from the compressor 22. For example, the auxiliary compressor 80 may be driven by an electric motor, a reciprocating engine or a turbine engine, among other power sources. The auxiliary compressor 80 is configured to provide a substantially clean air flow to the optical probe assembly 38 at a temperature below about 400 degrees Fahrenheit (204 degrees Celsius), thereby obviating the heat exchanger and filter described above with reference to FIG. 1. By providing a substantially clean and cool air flow 47 to the optical probe assembly 38, the purge air flow may serve to cool the window and substantially reduce accumulation of contaminants on the surface of the window.

In addition, because the optical probe assembly 38 is provided with air from two different sources (e.g., turbine compressor 22 and auxiliary compressor 80), the window may be protected from contaminants and elevated temperatures even if one air source fails to operate effectively. For example, if the motor powering the auxiliary compressor 80 is operating at reduced capacity or becomes completely disabled, the purge air flow across the window will be substantially reduced or terminated. However, because the curtain air is provided by the compressor 22, the curtain air will flow around the window as long as the turbine system 10 is in operation. Specifically, because the compressor blades are coupled to the shaft 19 driven by the turbine 18, hot gas flow through the turbine 18 will drive the compressor 22, thereby providing discharge air 42 to the optical probe assembly 38. In certain embodiments, the curtain air may provide sufficient cooling and contaminant protection to facilitate continued operation of the optical monitoring system 36. Similarly, if the heat exchanger 45 and/or the filter 46 of the embodiment described above with reference to FIG. 1 fail to operate effectively, air flow 47 to the optical probe assembly 38 may be reduced or terminated. However, the curtain air provided by the compressor 22 may provide sufficient cooling and contaminant protection to facilitate continued operation of the optical monitoring system 36.

Figure 3:
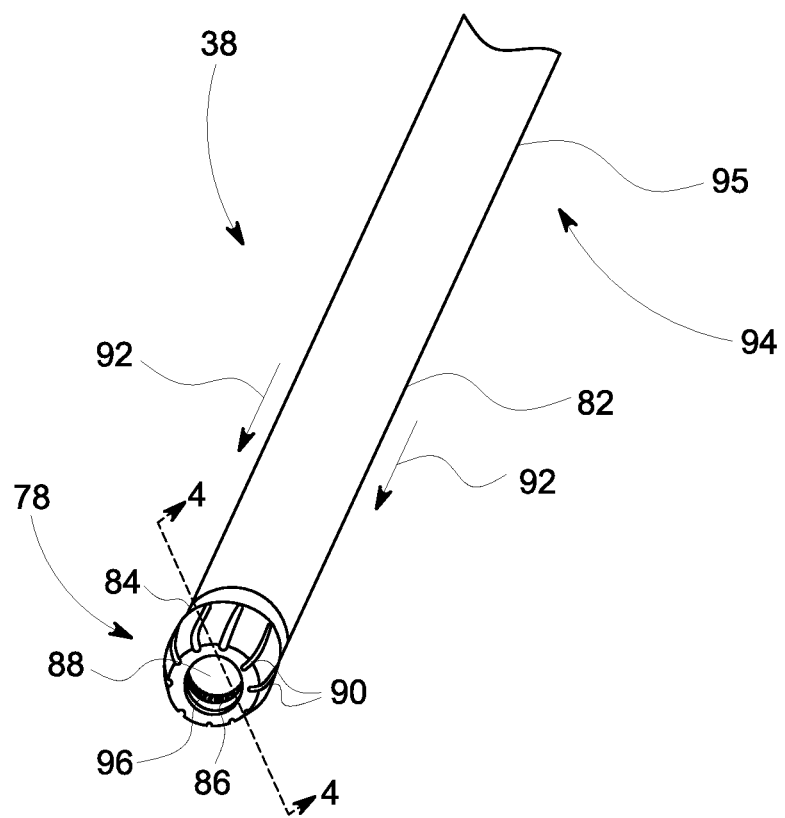
FIG. 3 is a perspective view of an embodiment of an optical probe assembly that may be employed within the optical monitoring system of FIG. 1.

FIG. 3 is a perspective view of an embodiment of an optical probe assembly 38 that may be employed within the optical monitoring system 36 of FIG. 1. As illustrated, the optical probe assembly 38 includes a curtain tube 82, and the tip assembly 78 includes an interchangeable curtain nozzle tip 84 and an interchangeable sight tube nozzle tip 86. In addition, the sight tube nozzle tip 86 is configured to house the window 88 which serves to protect the sight tube optics from the hot gas within the turbine 18. As previously discussed, the window 88 may be coupled to the interchangeable sight tube nozzle tip 86, thereby facilitating replacement of the window 88 without recalibration of the sight tube optics. Furthermore, as discussed in detail below, the sight tube nozzle tip 86 includes an annular protrusion configured to block movement of the window 88 toward the interior of the turbine 18, and the curtain nozzle tip 84 includes an annular protrusion configured to block movement of the sight tube nozzle tip 86 toward the interior of the turbine. Such a configuration may substantially reduce or eliminate the possibility of elements from the optical probe assembly 38 entering the interior of the turbine.

As illustrated, the curtain nozzle tip 84 includes multiple outlets, such as the illustrated axial recesses 90, configured to direct curtain air around the window 88. In the illustrated embodiment, the flow of curtain air is configured to divert hot gas away from the window 88, thereby substantially reducing contaminant accumulation on the surface of the window 88. As previously discussed, the compressor 22 is configured to provide a flow of curtain air 42 to the optical probe assembly 38 with sufficient pressure to establish a flow into the turbine interior. As illustrated, the curtain air flows in a direction 92 through a passage 94 formed between an outer surface 95 of the curtain tube 82 and an inner surface of the inspection port 76. In addition, the curtain nozzle tip 84 is in direct contact with the inner surface of the inspection port 76 such that the recesses 90 form openings extending between the passage 94 and the interior of the turbine 18. As a result, a stream of curtain air will be emitted from each recess 90, thereby shielding the window 88 from the flow of hot gas.

While the illustrated recesses 90 extend parallel to the longitudinal axis of the optical probe assembly 38, it should be appreciated that alternative embodiments may employ other recess configurations. For example, in certain embodiments, the recesses 90 may be configured to induce a swirling flow of curtain air around the window 88. In addition, further embodiments may employ more or fewer recesses 90 and/or narrower or wider recesses 90 to establish a desired flow pattern around the window 88. Furthermore, the curtain nozzle tip 84 may include other outlets configured to direct curtain air around the window 88. For example, certain embodiments may include holes extending between the passage 94 and the interior of the turbine 18. Consequently, a stream of curtain air will be emitted from each recess 90 and each hole, thereby shielding the window 88 from the flow of hot gas. As previously discussed, the curtain nozzle tip 84 may be removable from the curtain tube 82, thereby enabling selection of a desired outlet pattern for a particular turbine configuration. For example, a curtain nozzle tip 84 having a larger number of recesses 90 may be selected for a turbine system 10 operating in sandy/dusty environments to facilitate enhanced diversion of contaminants away from the window 88.

In addition, the sight tube nozzle tip 86 includes multiple openings 96 configured to provide a flow of purge air across the window 88. The flow of purge air is configured to cool the surface of the window 88 facing the hot gas 48, thereby substantially increasing the operational life of the window 88. In addition, the combination of the purge air provided by the openings 96 and the curtain air provided by the recesses 90 is configured to divert contaminants away from the window 88. As a result, accumulation of contaminants on the surface of the window 88 may be substantially reduced, thereby enhancing the accuracy of the optical monitoring system 36. Furthermore, because the window 88 is coupled to the sight tube nozzle tip 86, the window 88 may be replaced by exchanging nozzle tips 86. Consequently, the process of recalibration associated with replacement of the entire optical probe assembly 38 may be obviated. Moreover, because the sight tube nozzle tip 86 is removable, a nozzle tip 86 having a desired opening pattern may be selected for a particular turbine configuration. For example, advanced combustion systems configured to produce excessively hot gases may utilize a sight tube nozzle tip 86 having openings 96 configured to provide additional air flow across the window 88 to maintain the window 88 within a desired operating temperature range.

Figure 4:
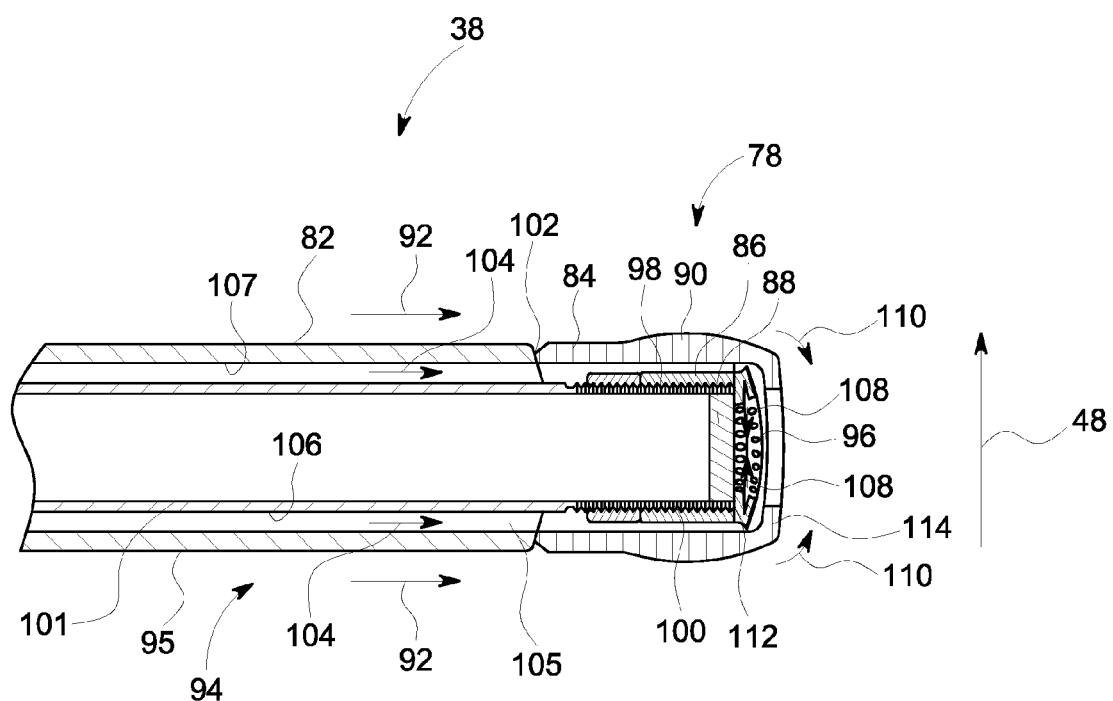
FIG. 4 is a cross-sectional view of the optical probe assembly of FIG. 3, taken along line 4-4.

FIG. 4 is a cross-sectional view of the optical probe assembly 38 of FIG. 3, taken along line 4-4. As previously discussed, the sight tube nozzle tip 86 may be removable to facilitate window replacement and/or selection of a desired opening configuration. In the illustrated embodiment, the sight tube nozzle tip 86 includes threads 98 configured to interface with threads 100 of the sight tube 101. In this configuration, the sight tube nozzle tip 86 may be secured and removed via rotation of the nozzle tip 86 relative to the sight tube 101. Similarly, the curtain nozzle tip 84 may be secured to the curtain tube 82 with a threaded connection 102. While threaded connections are employed in the illustrated embodiment to secure the sight tube nozzle tip 86 to the sight tube 101 and to secure the curtain nozzle tip 84 to the curtain tube 82, alternative embodiments may utilize other connection systems (e.g., fasteners, protrusions/recesses, etc.) to removably secure each nozzle tip to a respective tube. In further embodiments, the sight tube nozzle tip 86 and/or the curtain nozzle tip 84 may be fixed to the respective tube (e.g., via a welded connection, press fit, etc.).

As previously discussed, the compressor 22 is configured to provide a flow of curtain air 42 to the optical probe assembly 38 with sufficient pressure to establish a flow into the turbine interior. As illustrated, the curtain air flows in a direction 92 through a passage 94 formed between an outer surface 95 of the curtain tube 82 and an inner surface of the inspection port 76. In addition, the curtain nozzle tip 84 is in direct contact with the inner surface of the inspection port 76 such that the recesses 90 form openings extending between the passage 94 and the interior of the turbine 18. As a result, a stream of curtain air will be emitted from each recess 90, thereby shielding the window 88 from the flow of hot gas. Similarly, the compressor 22, via the heat exchanger 45 and the filter 46, or the auxiliary compressor 80 is configured to provide a flow of purge air 47 to the optical probe assembly 38 with sufficient pressure to establish an air flow into the turbine interior. As illustrated, the purge air flows in a direction 104 through a passage 105 formed between an outer surface 106 of the sight tube 101 and an inner surface 107 of the curtain tube 82. In addition, the sight tube nozzle tip 86 is in direct contact with the curtain nozzle tip 84, thereby directing the flow of purge air through the openings 96. As a result, a stream of purge air will be emitted from each opening 96 in a radially inward direction 108, thereby cooling the window 88 and diverting contaminants away from the window 88.

In addition, the curtain air emitted from the recesses 90 will flow in a direction 110, thereby further diverting contaminants away from the window 88. For example, particulate matter, such as unburned hydrocarbons, sand, dirt, lubricant and/or other contaminants, may be present within the flow of hot gas 48. Because the pressure of the curtain air is greater than the pressure of the hot gas, the flow of curtain air will divert the flow of hot gas away from the window 88. Consequently, contaminant accumulation on the surface of the window 88 facing the interior of the turbine 18 may be substantially reduced. However, because the curtain air is extracted directly from the compressor 22, the curtain air may contain dirt and/or lubricant from the compressor 22. In addition, because the curtain air may be extracted from a later stage of the compressor, the temperature of the curtain air may be insufficient to effectively cool the window 88 for an extended duration. Consequently, the flow of purge air in the direction 108 across the window serves to protect the window from contaminants that may be present within the curtain air, and to cool the surface of the window 88. The combination of the curtain air and the purge air may serve to maintain the window 88 within a desired operating temperature range, and to ensure that the surface of the window 88 remains substantially clear, thereby facilitating operation of the optical monitoring system 36. Furthermore, because the curtain air and the purge air are provided by different air sources, the window may be protected from the hot gas despite partial or complete failure of one air source.

In the illustrated embodiment, the sight tube nozzle tip 86 includes an annular protrusion 112 configured to block movement of the window 88 toward the interior of the turbine. Consequently, the possibility of the window 88 and/or any optical component positioned within the sight tube 101 entering the turbine interior is substantially reduced or eliminated, thereby ensuring efficient operation of the turbine 18. In addition, the curtain tube 84 includes an annular protrusion 114 configured to block movement of the sight tube nozzle tip 86 toward the interior of the turbine 18. As a result, the possibility of the sight tube nozzle tip 86 and/or the sight tube 101 entering the turbine interior is substantially reduced or eliminated. Due to the combination of the sight tube annular protrusion 112 and the curtain tube annular protrusion 114, the possibility of the optical probe assembly 38 interfering with operation of the turbine 18 is substantially reduced or eliminated.

Figure 5:
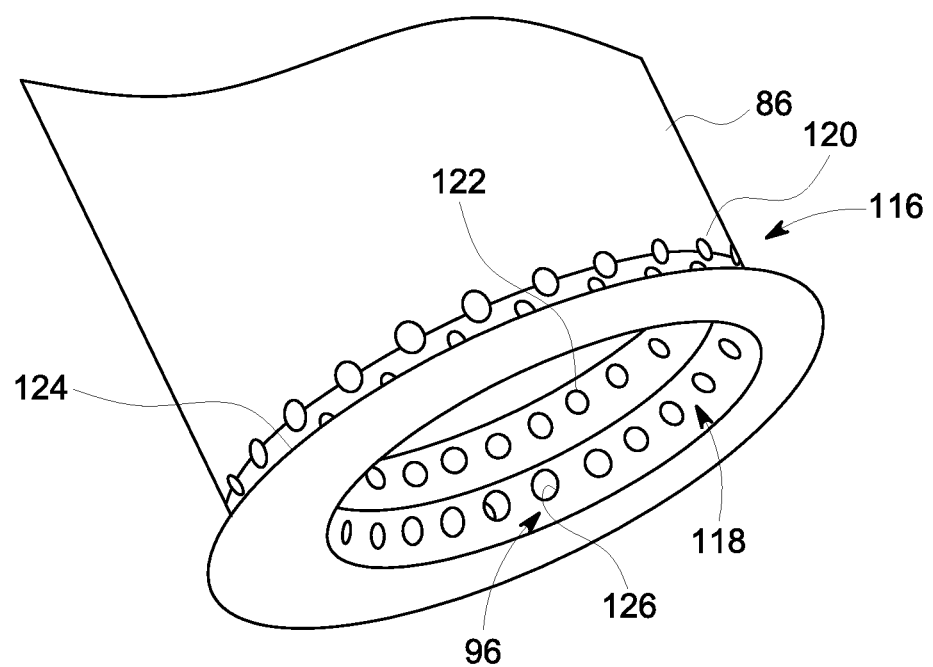
FIG. 5 is a perspective view of an embodiment of a sight tube nozzle tip that may be employed within the optical probe assembly of FIG. 3.

FIG. 5 is a perspective view of an embodiment of a sight tube nozzle tip 86 that may be employed within the optical probe assembly 38 of FIG. 3. As illustrated, the nozzle tip 86 includes a first row 116 of openings 96, and a second row 118 of openings 96. In the illustrated embodiment, each opening within the first row 116 is configured to direct the purge air substantially perpendicular to the window 88. Specifically, each opening 96 within the first row 116 includes an inlet 120 and an outlet 122. As illustrated, the inlet 120 and the outlet 122 are positioned to direct the purge air flow radially inward along a plane substantially parallel to the window surface. Furthermore, each opening with the second row 118 is configured to direct the purge air flow axially outward from the window 88. Specifically, an inlet 124 and an outlet 126 of each opening 96 within the second row 118 are configured to direct the purge air flow toward the hot gas within the turbine. The combination of establishing a flow across the window 88 and away from the window 88 may serve to protect the window from contaminants and to maintain the window within a desired operating temperature range.

While two rows 116 and 118 are employed in the illustrated embodiment, it should be appreciated that more or fewer rows of openings 96 may be present in alternative embodiments. For example, certain sight tube nozzle tips 86 may include 1, 2, 3, 4, 5, 6, or more rows of openings 96. In addition, while each opening 96 is directed radially inward in the illustrated embodiment, it should be appreciated that alternative embodiments may include openings configured to direct the purge air flow in a swirling pattern. Furthermore, it should be appreciated that the number, size and/or shape of each opening 96 may be particularly configured to establish a desired flow pattern. For example, in the illustrated embodiment, the sight tube nozzle tips 86 are interchangeable such that a desired arrangement of openings may be selected for a particular turbine configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a sight tube configured to optically communicate with an interior of a rotary machine via insertion within an inspection port;
a first interchangeable nozzle tip removably secured to the sight tube, wherein the first interchangeable nozzle tip comprises a window and a plurality of openings configured to direct purge air across the window;
a curtain tube disposed about the sight tube and configured to direct the purge air from a first air source to the plurality of openings via a first passage formed between an inner surface of the curtain tube and an outer surface of the sight tube; and
a second interchangeable nozzle tip removably secured to the curtain tube, wherein the second interchangeable nozzle tip comprises a plurality of outlets configured to direct curtain air around the window;
wherein the curtain tube is configured to direct the curtain air from a second air source to the plurality of outlets via a second passage formed between an outer surface of the curtain tube and an inner surface of the inspection port.

2. The system of claim 1, wherein the first air source comprises an air flow from a compressor powered independently from the rotary machine.

3. The system of claim 1, wherein the first air source comprises a discharge air flow from a compressor rotatably coupled to the rotary machine via a shaft, wherein the discharge air flow is cooled, filtered, or a combination thereof, prior to flowing into the first passage.

4. The system of claim 1, wherein the second air source comprises a discharge air flow from a compressor rotatably coupled to the rotary machine via a shaft.

5. The system of claim 1, wherein the plurality of openings is configured to direct the purge air radially inward across the window.

6. The system of claim 5, wherein the plurality of openings comprises a first row of openings configured to direct the purge air substantially perpendicular to the window, and a second row of openings configured to direct the purge air axially outward from the window.

7. The system of claim 1, wherein the first interchangeable nozzle tip is removably secured to the sight tube via a threaded connection.

8. The system of claim 1, wherein at least one of the plurality of outlets comprises a recess extending between the second passage and the interior of the rotary machine.

9. The system of claim 1, wherein the first interchangeable nozzle tip comprises an annular protrusion configured to block movement of the window toward the interior of the rotary machine.

10. The system of claim 1, wherein the second interchangeable nozzle tip comprises an annular protrusion configured to block movement of the first interchangeable nozzle tip toward the interior of the rotary machine.

11. A system comprising:
a sight tube configured to optically communicate with an interior of a rotary machine via insertion within an inspection port, wherein the sight tube comprises a window and a plurality of openings configured to direct purge air across the window; and
a curtain tube disposed about the sight tube and configured to direct purge air from a first air source to the plurality of openings via a first passage formed between an inner surface of the curtain tube and an outer surface of the sight tube;
wherein the curtain tube comprises a plurality of outlets configured to direct curtain air around the window, and the curtain tube is configured to direct the curtain air from a second air source to the plurality of outlets via a second passage formed between an outer surface of the curtain tube and an inner surface of the inspection port.

12. The system of claim 11, comprising:
a first interchangeable nozzle tip removably secured to the sight tube, wherein the first interchangeable nozzle tip includes the window and the plurality of openings; and
a second interchangeable nozzle tip removably secured to the curtain tube, wherein the second interchangeable nozzle tip includes the plurality of outlets.

13. The system of claim 11, wherein the first air source comprises an air flow from a compressor powered independently from the rotary machine.

14. The system of claim 11, wherein the first air source comprises a discharge air flow from a compressor rotatably coupled to the rotary machine via a shaft, wherein the discharge air flow is cooled, filtered, or a combination thereof, prior to flowing into the first passage.

15. The system of claim 11, wherein the second air source comprises a discharge air flow from a compressor rotatably coupled to the rotary machine via a shaft.

16. A system comprising:
a sight tube configured to optically communicate with an interior of a rotary machine via insertion within an inspection port; and
an interchangeable nozzle tip removably secured to the sight tube, wherein the interchangeable nozzle tip comprises a window and a plurality of openings configured to direct purge air across the window.

17. The system of claim 16, comprising:
a curtain tube disposed about the sight tube and configured to direct the purge air from a first air source to the plurality of openings via a first passage formed between an inner surface of the curtain tube and an outer surface of the sight tube; and
a second interchangeable nozzle tip removably secured to the curtain tube, wherein the second interchangeable nozzle tip comprises a plurality of outlets configured to direct curtain air around the window;
wherein the curtain tube is configured to direct the curtain air from a second air source to the plurality of outlets via a second passage formed between an outer surface of the curtain tube and an inner surface of the inspection port.

18. The system of claim 16, wherein the interchangeable nozzle tip is removably secured to the sight tube via a threaded connection.

19. The system of claim 16, wherein the plurality of openings is configured to direct the purge air radially inward across the window.

20. The system of claim 19, wherein the plurality of openings comprises a first row of openings configured to direct the purge air substantially perpendicular to the window, and a second row of openings configured to direct the purge air axially outward from the window.

* * * * *